US008286721B2

(12) United States Patent
Gerbaud et al.

(10) Patent No.: US 8,286,721 B2
(45) Date of Patent: Oct. 16, 2012

(54) ELECTRIC POWER HOE

(75) Inventors: Nicolas Gerbaud, Monsireigne (FR); Peter Vion, Pouzauges (FR); Guillaume Fanjas, Meaudre (FR); Didier Grare, Les Clouzeaux (FR); Frédéric Meniere, Lyons (FR); Franck Albin, Donzere (FR)

(73) Assignee: Pubert Henri SAS, Chantonnay (FR)

( * ) Notice: Subject to any disclaimer, the term of this patent is extended or adjusted under 35 U.S.C. 154(b) by 87 days.

(21) Appl. No.: 12/297,766

(22) PCT Filed: Apr. 19, 2007

(86) PCT No.: PCT/EP2007/053815
§ 371 (c)(1),
(2), (4) Date: Jun. 2, 2009

(87) PCT Pub. No.: WO2007/122169
PCT Pub. Date: Nov. 1, 2007

(65) Prior Publication Data
US 2010/0065291 A1 Mar. 18, 2010

(30) Foreign Application Priority Data
Apr. 20, 2006 (FR) ...................................... 06 03513

(51) Int. Cl.
*A01B 33/00* (2006.01)
(52) U.S. Cl. ......................................................... 172/42
(58) Field of Classification Search ................ 172/7, 42; 701/50
See application file for complete search history.

(56) References Cited

U.S. PATENT DOCUMENTS

| 6,523,334 | B1 * | 2/2003 | Dettmann | 56/11.9 |
| 6,758,030 | B2 * | 7/2004 | Dettmann | 56/11.9 |
| 7,007,446 | B2 * | 3/2006 | Dettmann | 56/11.9 |
| 7,305,778 | B2 * | 12/2007 | Wakitani et al. | 37/245 |
| 7,434,642 | B2 * | 10/2008 | Dettmann | 180/68.5 |
| 7,584,804 | B2 * | 9/2009 | Fukuzumi et al. | 172/42 |
| 2010/0051299 | A1 * | 3/2010 | Marcil et al. | 172/42 |

FOREIGN PATENT DOCUMENTS

| DE | 19725237 | 12/1997 |
| DE | 19725238 | 12/1997 |
| EP | 0817352 | 1/1998 |
| EP | 1452084 | 9/2004 |

OTHER PUBLICATIONS

International Searh Report, dated Aug. 30, 2007 for corresponding International Application No. PCT/EP2007/053815 filed Apr. 19, 2007.
International search Report of Counterpart Application No. PCT/EP2007/053813 filed Apr. 19, 2007.

* cited by examiner

*Primary Examiner* — Thomas B Will
*Assistant Examiner* — Joel F. Mitchell
(74) *Attorney, Agent, or Firm* — David D. Brush; Westman, Champlin & Kelly, P.A.

(57) ABSTRACT

A power hoe is provided, which includes an electric motor operating tools for work in the ground and at least one battery intended to power the motor and having a set of functionalities. The power hoe is able to operate in at least two operating modes selected according to at least one information item representative of a level of charge remaining in the battery or batteries. These operating modes include, at least: a normal operating mode, in which all of the functionalities of the equipment are available, including a functionality allowing the motor to be supplied with additional power for a limited period of time; and a downgraded operating mode in which at least the functionality allowing the motor to be supplied with additional power is disabled.

13 Claims, 3 Drawing Sheets

ELECTRIC POWER HOE

CROSS-REFERENCE TO RELATED APPLICATIONS

This Application is a Section 371 National Stage Application of International Application No. PCT/EP2007/053815, filed Apr. 19, 2007 and published as WO 2007/122169 on Nov. 1, 2007, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of power agriculture. More specifically, the disclosure relates to power agriculture or soil cultivation equipment with a walking operator, such as power hoes. It relates in particular to such equipment that runs on electricity and is battery-operated.

BACKGROUND OF THE DISCLOSURE

Power agriculture equipment running on electricity has been known for a long time. There are two solutions for it. The first consists of permanently connecting the equipment to an electrical outlet for its power supply. The second is to provide the equipment with electricity accumulators, or batteries, to ensure its electrical autonomy. This disclosure relates in particular to power agriculture equipment operating according to this second solution.

Battery-operated power agriculture equipment presents various disadvantages, and is therefore less commonly used than thermal motor equipment. A first disadvantage is its limited power, which limits its possibilities for use in work requiring power, such as earth works. Among these disadvantages, it is also possible to cite in particular the problems of autonomy.

It should be noted that power hoes, or powered hoeing machines, are soil cultivation tools, which consequently require a relatively high power. Moreover, unlike other power agriculture equipment, power hoes generally do not have wheels independent of the tools. They are moved by rolling over the blades of the tools, which then rotate at reduced speed. It is obvious that this movement requires a much lower power than that needed for soil cultivation.

The battery or batteries powering the motor of the power agriculture equipment, and more specifically the motors of power hoes, which must provide a high power in order to cultivate the soil, must indeed provide a high power for a relatively long period in order for the user to be capable of working efficiently. The performance of batteries suitable for such a use decreases over time. Thus, a power hoe equipped with a suitable battery may offer the user good usage conditions in particular in terms of power supplied and duration of autonomy, when the battery or batteries are new. Wear of batteries leads to a decrease in their performance, and consequently has a detrimental effect on usage conditions.

Improper use of batteries substantially accelerates their decrease in performance. In some battery models used, such as, for example, lead batteries, nickel-metal-hydride batteries or lithium batteries, it is thus detrimental to fully discharge the battery, or even to reduce the voltage at its terminals below a certain level. To protect these batteries, the user must therefore monitor an indicator, generally visual, which indicates the charge level of the batteries. When the charge level falls below a critical level, the user must stop using the equipment and recharge the batteries.

However, it is common for the user to neglect to monitor the charge level of the batteries of the equipment and to continue to use the equipment until the batteries can no longer supply the energy necessary for operation of the motor. Such behavior is seriously detrimental to the performance and lifetime of batteries.

The user may also take into account the insufficient charge level of the batteries when he/she is far away from the current source that would enable the equipment batteries to be recharged. The user thus continues to use the equipment, and therefore continues to cultivate the soil along the patch until reaching the current source. This behavior is also detrimental to battery performance.

These problems associated with premature wear of batteries make the use of battery-operated power hoes less valuable. The constraints on power hoes make them less suitable for battery-operated use than other power agriculture equipment.

SUMMARY

An aspect of the disclosure relates to a power hoe, including an electric motor actuating soil cultivation tools and at least one battery intended to power said motor, and having a set of functionalities, which, according to an embodiment of the invention, can work according to at least two operating modes selected on the basis of at least one information item representing a charge level of the battery or batteries, including at least:

a normal operating mode (also called "running mode") in which all of said functionalities of said equipment are available, including a functionality making it possible to supply additional power to the motor for a limited time period; and a downgraded operating mode (also called "displacement mode") in which at least said functionality making it possible to supply additional power to said motor is deactivated.

According to an embodiment of the invention, such a power hoe also includes a functionality making it possible to supply additional power to the motor for a limited time period, which is available only in the normal operating mode.

Such a functionality enables the user, in normal mode, to obtain more power for using the power hoe in harder earth or earth containing roots.

Preferably, in the downgraded operating mode, the electric power supplied to the motor is limited to a level below the electric power supplied in normal operating mode.

The user thus cannot use the power hoe effectively for working when it is in downgraded mode. The user is thus not tempted to use it to cultivate the soil until the battery has been exhausted. Moreover, the batteries are discharged less quickly in this mode.

Advantageously, in the downgraded operating mode, the electric power supplied to the motor enables only the movement of the power hoe.

The user is thus not required, when the power hoe batteries need to be recharged, to carry the power hoe to the charger or to the electric power supply. The user can indeed move it by rolling it on its tools, which requires a much lower power than does soil cultivation.

Preferably, the motor can run according to at least two operating speeds, and, in downgraded mode, at least one of the speeds is not accessible.

Advantageously, a power hoe according to an embodiment of the invention includes a visual indicator enabling the user to see the operating mode.

The user can thus very easily determine the operating mode of the power hoe.

According to an alternative embodiment of the invention, such a power hoe implements a third operating mode in which the motor is stopped before the battery or batteries are completely discharged.

The battery or batteries are thus protected from damage due to excessive discharge, even if the user were to use the power hoe in downgraded mode without stopping.

According to a preferred embodiment of the invention, such a power hoe includes an electronic card providing the functions of measuring the information representing the charge of the battery or batteries, delivering the electric power to the motor, and activating or deactivating the functionalities of the power hoe on the basis of the operating mode.

Such an electronic card makes it possible to easily control the operation of the power hoe in various modes.

Preferably, the electronic card stores at least one of the information items belonging to the group comprising the number of switches to at least one of the operating modes and the operating time in at least one of the operating modes.

The electronic card thus records the information, which makes it possible to understand any premature deterioration of the batteries.

Advantageously, the electronic card includes means for measuring parameters associated with the motor, making it possible to detect a blockage of the motor, and can cut off the electric power supply of the motor and/or the power hoe if said motor is blocked.

The electronic card can thus act as a torque limiter and protect the transmission mechanism and the motor from damage in the event of a blockage.

Advantageously, the electronic card can communicate with a power hoe maintenance apparatus.

The person responsible for maintaining the power hoe can thus access all of the information stored by the electronic card.

Preferably, the electronic card includes a function of reversing the motor operation.

It is thus unnecessary to integrate an operation reversal mechanism in the power hoe.

According to a preferred embodiment, the battery or batteries can be removed from the power hoe.

It is thus easier for the user to carry the power hoe.

According to another preferred embodiment, the activation of the power hoe is controlled by a simultaneous action of the user on a start/stop switch and a speed variation control, and the start-up of the motor, when the power hoe is on, is controlled by another action of the user on the speed variation control.

The risks of accident due to involuntary start-up of the power hoe are thus limited.

Advantageously, the absence of an action by the user on a power hoe control causes the power hoe to turn off after a predetermined time.

The risks of accident if the user leaves the power hoe on are thus limited.

According to an advantageous embodiment, the spindle of the electric motor is arranged on the power hoe at a tilt angle with respect to the vertical, toward the front or toward the back of the power hoe.

This arrangement enables better distribution of the power hoe weight and better compactness of the power hoe.

According to a particularly advantageous embodiment, which moreover can be implemented independently of the other aspects of the invention, the power hoe can include at least one removable transport wheel capable of being secured to at least one of the soil cultivation tools so as to facilitate its movement.

BRIEF DESCRIPTION OF THE DRAWINGS

Other features and advantages will become clearer on reading the following description of a preferred embodiment, given by way of a simple illustrative and non-limiting example, and the appended drawings, in which.

DETAILED DESCRIPTION OF ILLUSTRATIVE EMBODIMENTS

1. Summary of the Principle of an Embodiment of the Invention

The general principle of an embodiment of the invention is the management of power hoe functionalities according to the charge level of the battery. The power hoe can thus run in a plurality of modes, including a running mode (also called "normal mode") in which all of the functionalities are available, and a downgraded mode (also called "displacement mode") in which certain functionalities are not available, or are only partially available.

2. Power Hoe According to an Embodiment of the Invention

Figure 1:
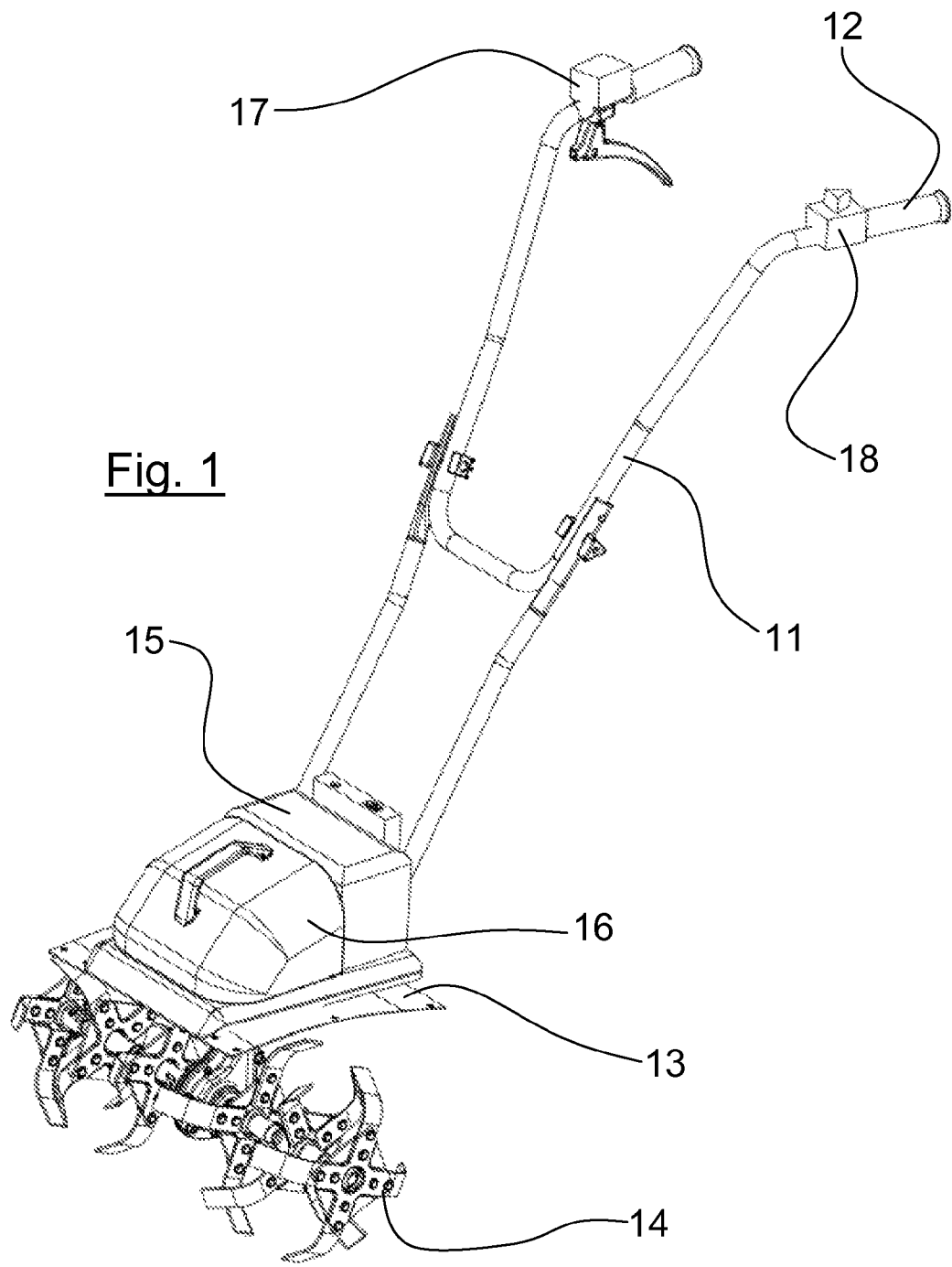
FIG. 1 shows a power hoe according to an embodiment of the invention.
Figure 3:
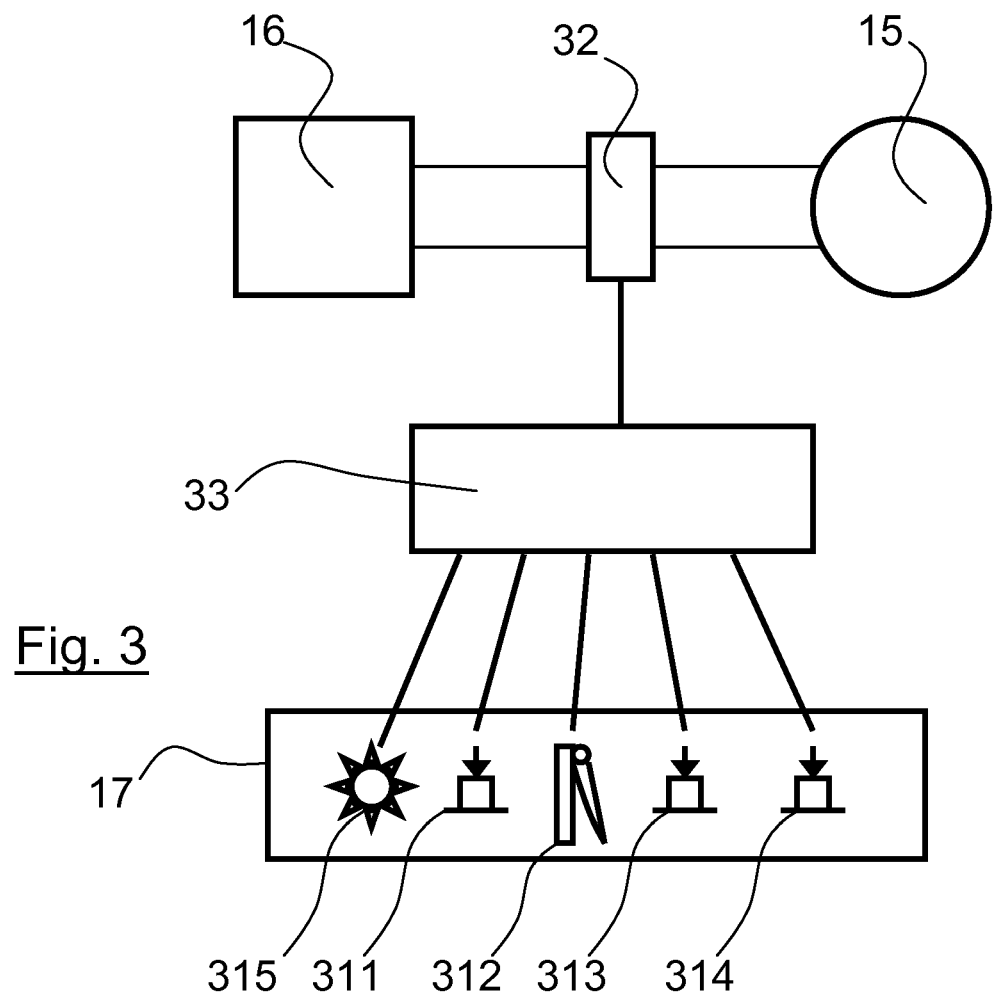
FIG. 3 diagrammatically shows the interactions between the various elements of the power hoe of FIG. 1.

FIG. 1 shows a power hoe according to an embodiment of the invention. FIG. 3 diagrammatically shows certain elements constituting this power hoe, and the interactions between these various elements.

This power hoe conventionally comprises handlebars 11 with handgrips 12 at the ends, a crankcase 13, or machine body, and soil cultivation tools 14. This power hoe is electric, and therefore comprises an electric motor 15 supplied by batteries 16.

A control box 17, located near one of the handgrips 12, enables the user to control the power hoe, and in particular the electric power supplied by the batteries 16 to the motor 15. This control box 17, which is diagrammatically shown in FIG. 3, can in particular include a start/stop pushbutton 311, which controls the general running of the power hoe. According to another embodiment, this start/stop pushbutton can also be provided on the machine body.

The control box 17 also comprises other controls, which control the various functionalities of the power hoe. A plurality of these functionalities are associated with the variator 32, which determines the electrical energy supplied to the motor 15 of the power hoe by the batteries 16.

Thus, a speed variation control 312 makes it possible to modify the rotation speed of the motor 15, and therefore of the tools 14. Similarly, according to the models, a higher speed button 313 can make it possible to supply additional power to the motor 15 for a limited time, for example when passing through harder earth or earth containing roots. The button 313 can also, depending on the model, be arranged on another control box 18 located near the other handgrip. To avoid continuous use of the power hoe with this functionality, the higher speed button 313 must be held pressed by the user in order for the function to be active.

A backward button 314 enables the direction of rotation of the motor 15, and therefore the tools 14, to be reversed. The backward button 314 must be held pressed by the user in order for the function to be active.

The power hoe of FIG. 1 does not comprise wheels for moving. When the tools are not cultivating the soil, it therefore moves on the blades of the tools 14. Of course, this movement requires a much lower power than the power for soil cultivation by these same tools 14.

3. Electronic Card and Various Operating Modes

The controls and functionalities of the power hoe, as well as the control of the variator 32, which supplies the electric power to the motor 15, are managed by a specific electronic card 33.

As diagrammatically shown in FIG. 3, the various controls of the control box 17 and/or 18 are associated with the electronic card 33. The electronic card then generates, in particular according to these controls, an instruction sent to the variator 32, which determines the electric power sent to the motor 15 by the batteries 16.

This electronic card 33 also controls the voltage at the terminals of the batteries 16. This voltage represents the charge level of the batteries. According to this voltage, the electronic card 33 causes the power hoe to run according to various operating modes. The operating mode of the power hoe is indicated to the user by a visual light indicator 315 consisting of a light-emitting diode (LED) located on the control box 17 and/or 18 or on the machine body.

Figure 2:
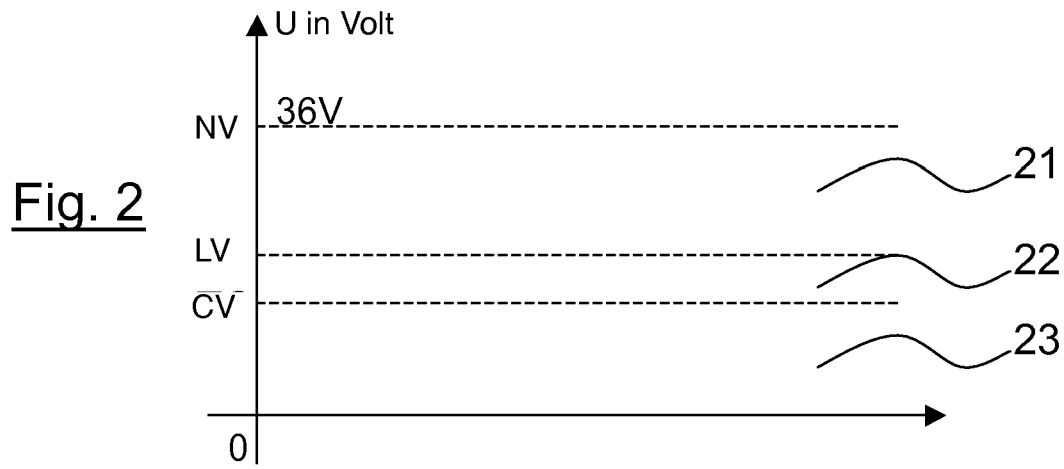
FIG. 2 is a graph showing the operating modes of the power hoe of FIG. 1 as a function of the voltage at the battery terminals.

The various operating modes are shown in the graph of FIG. 2, as a function of the voltage U at the terminals of the batteries 16. When the voltage U at the terminals of the batteries 16 is between its nominal voltage NV, in this case 36V, and a low voltage LV, the power hoe runs in normal mode 21, or running mode. In this operating mode, all of the functionalities of the power hoe are available to the user, who can operate the motor at full power in order to cultivate the earth.

When the voltage U at the terminals of the batteries 16 is between the low voltage LV and a critical voltage CV, the power hoe runs in downgraded mode 22, or displacement mode. In this operating mode, the user no longer has access to all of the functionalities of the power hoe. The user cannot thus use the higher speed functionality, controlled by the button 313.

By contrast, in this mode, the power supplied to the motor is limited, and the tools thus rotate at a limited speed, which does not enable cultivation of the earth. This power limitation is caused by a limitation of the voltage supplied to the motor by the variator, due to an instruction from the electronic card. This mode therefore enables the user only to move the power hoe so that the user can easily reach an electrical supply source in order to recharge the batteries.

When the voltage U at the terminals of the batteries is equal to or below the critical voltage CV, the power hoe switches to default mode 23, which causes, after a short time, the motor to stop in order to preserve the battery. This stopping therefore occurs before the battery is completely discharged.

4. Other Features and Advantages

The use of an electronic card to control the functionalities of the power hoe makes it easier to maintain the power hoe. Indeed, the electronic card 33 can be connected to a computer dedicated to maintenance, for example by means of a specific connection cable. It can thus provide said computer with information such as the serial number of the power hoe and the various elements that it includes (battery, motor, variator, etc.), the voltage U at the terminals of the battery, and the usage time of the power hoe and each of its components (battery, variator, motor, etc.), which will have been stored by the electronic card.

The electronic card also stores the usage time of the power hoe in downgraded mode 22, and the number of switches to default mode, and can provide this information to the maintenance computer. This information can, for example, explain premature wear of the battery, and make it easier to maintain the power hoe.

The batteries of the power hoe according to an embodiment of the invention are removable, and can be recharged only when they are removed from the power hoe. This solution has a number of advantages. Thus, to carry the power hoe, the user can separate the batteries and carry them in one hand while carrying the power hoe in the other. The loads are thus distributed and it is easier to carry the power hoe. Moreover, this solution enables the user to use a second battery set, enabling the user to continue using the power hoe when the first battery set is discharged, while the latter is being recharged. This solution therefore provides additional comfort for the power hoe user.

The use of an electric motor for this rototiller makes it possible to modify the placement of the motor. Indeed, unlike in thermal motors, it is not necessary to position an electric motor vertically. To optimize its compactness and the distribution of the weight of the equipment, it is therefore advantageous to arrange the spindle of the motor at a tilt angle toward the front or back of the equipment.

Figure 4:
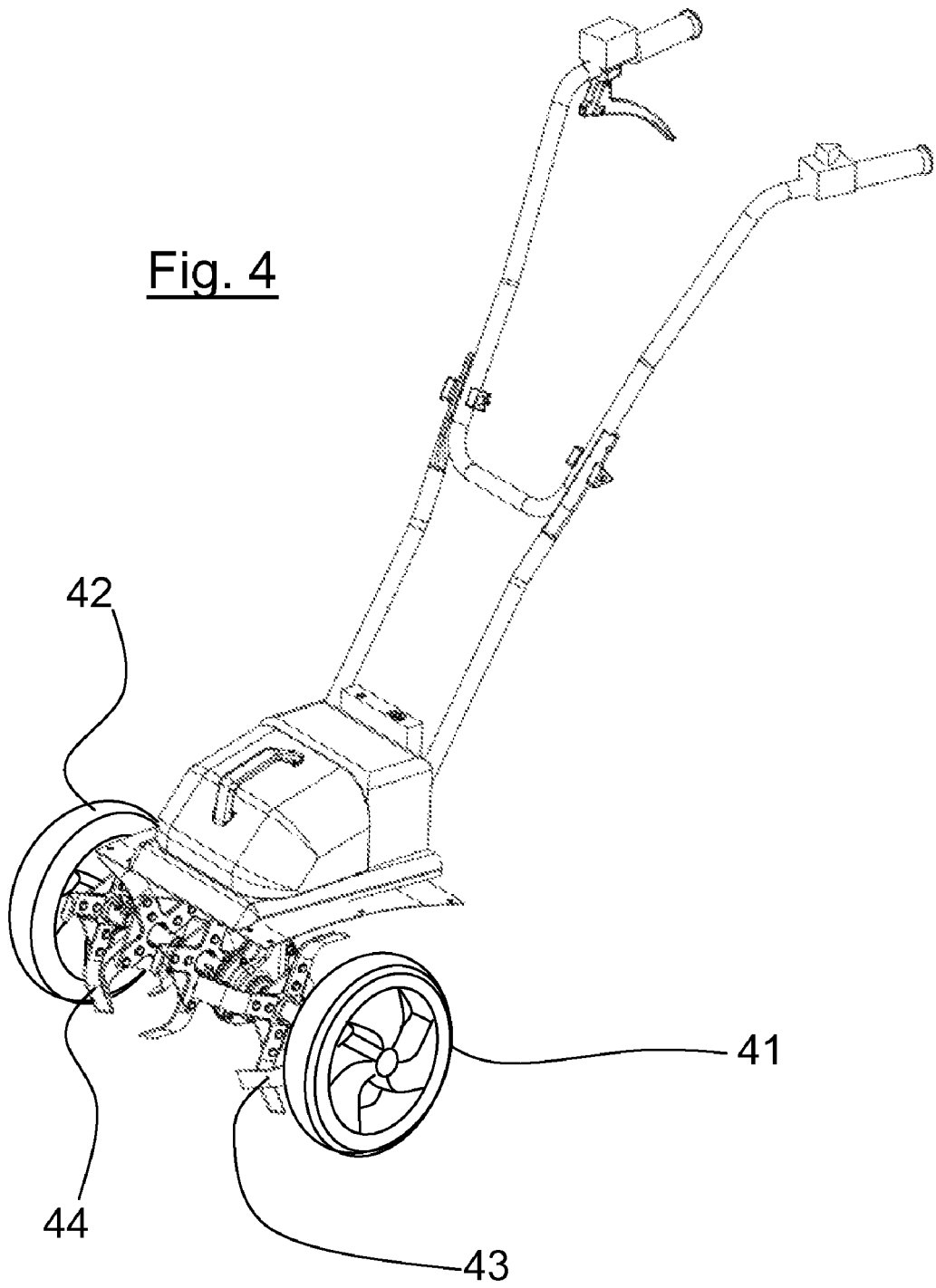
FIG. 4 shows a power hoe according to another embodiment of the invention.

FIG. 4 shows a power hoe according to a specific embodiment of the invention, implementing removable transport wheels 41 and 42. These transport wheels have a diameter slightly greater than that of the soil cultivation tools, and can be secured, for example by clipping, to the tools 43 and 44, respectively, which are located on the sides of the power hoe. The axis of rotation of the tools therefore becomes the axis of the wheels 41 and 42.

This specific embodiment, which can be implemented on any type of power hoe, including power hoes with thermal motors, makes it possible to move the power hoe more easily than on the blades of the tools, as is done in the prior art. It does not, however, require a transmission mechanism separate from the one supplying power to the tools. Of course, in the downgraded mode of this embodiment, the motor actuates both the tools and the wheels associated therewith.

The power hoe according to an embodiment of the invention can also include safety devices, making it possible to prevent accidental start-up of the equipment by a child. These safety devices can of course be implemented independently of the running or downgraded operating modes, and independently of one another.

Thus, when the start/stop pushbutton 311 is actuated, the electronic card 33 verifies that the speed variation control 312 is actuated. If the speed variation control is not actuated, the power hoe does not start up. If the speed variation control 312 is actuated, the power hoe is put in operating mode, but the electronic card 33 waits until the speed variation control 312 is relaxed and actuated again before actually starting the motor.

For greater security, in particular for children, if an adult leaves the power hoe unmonitored, the electronic card 33 automatically turns the power hoe off when the speed variation control 312 is not actuated for a predetermined time, for example of one minute. To start working again, the start-up sequence needs to be performed again.

Finally, for protection of the power hoe, the electronic card 33 is equipped with means for measuring the current, the voltage and the temperature, which make it possible to detect an abnormal blockage of the mechanical transmission of the power hoe, for example jamming of the tools in very large roots or stones. The electronic card 33 can in this case cut the electric power supply of the motor or the power hoe, in order to protect the transmission mechanism and the motor.

An embodiment of the invention enables efficient use of electric battery-operated power hoes.

An embodiment of the invention provides an electric battery-operated power hoe, in which battery wear is limited.

In particular, an embodiment of the invention allows the batteries of such a power hoe to be used exclusively or almost exclusively under conditions of use ensuring minimal decrease in performance.

An embodiment of the invention provides such a power hoe for which management of the battery charge is as convenient as possible for the user.

Although the present disclosure has been described with reference to one or more examples, workers skilled in the art will recognize that changes may be made in form and detail without departing from the scope of the disclosure and/or the appended claims.

The invention claimed is:

1. A power hoe, comprising:
   an electric motor, which actuates soil cultivation tools;
   at least one battery intended to power said motor; and
   means for determining an electric power supplied to said motor by said at least one battery, as a function of at least one information item representing a charge level of said battery or batteries, so as to provide:
   a normal operating mode, in which said motor is supplied with a first electric power for making the power hoe move by rolling over the soil cultivation tools and for making the cultivation tools cultivate the soil;
   a higher operating speed functionality, in which said motor is supplied with additional power compared to said first electric power, for a limited time period and as long as a corresponding higher speed button is held pressed by a user; and
   a downgraded operating mode, in which the electric power supplied to said motor, which actuates said soil cultivation tools, is limited to a level below said first electric power, and enables only the movement of said power hoe using said actuating soil cultivation tools,
   and wherein said means for determining stores at least one of the information items selected from the group consisting of:
   a number of switches to at least one of the operating modes; or
   an operating time in at least one of the operating modes.

2. The power hoe according to claim 1, wherein the power hoe includes a visual indicator enabling the user to see the operating mode.

3. The power hoe according to claim 1, wherein the power hoe implements a third operating mode in which said motor is stopped before said at least one battery is completely discharged.

4. The power hoe according to claim 1, wherein said determining means includes means for measuring parameters associated with said motor, making it possible to detect a blockage of said motor.

5. The power hoe according to claim 4, wherein said determining means cuts off the electric power supply of said motor or of said equipment in the event of a blockage of said motor.

6. The power hoe according to claim 1, wherein said determining means can communicate with a maintenance apparatus.

7. The power hoe according to claim 1, wherein said determining means includes a function of reversing the motor operation.

8. The power hoe according to claim 1, wherein said at least one battery is removable.

9. The power hoe according to claim 1, wherein the power hoe's activation is controlled by a simultaneous action of the user on a start/stop switch and a speed variation control, and wherein the start-up of said motor, when said power hoe is on, is controlled by another action of the user on said speed variation control.

10. The power hoe according to claim 1, wherein absence of an action by the user on a power hoe control causes the power hoe to turn off after a predetermined time.

11. The power hoe according to claim 1, wherein a spindle of said electric motor is arranged on said equipment at a tilt angle with respect to vertical, toward a front or a back of said power hoe.

12. The power hoe according to claim 1, wherein the power hoe includes at least one removable transport wheel capable of being secured to at least one of the soil cultivation tools so as to facilitate movement of said power hoe.

13. A power hoe, comprising:
   an electric motor, which actuates soil cultivation tools;
   at least one battery intended to power said motor; and
   an electronic circuit connected to the electric motor and the at least one battery and configured to determine an electric power supplied to said motor by said at least one battery, as a function of at least one information item representing a charge level of said battery or batteries, so as to provide:
   a normal operating mode, in which said motor is supplied with a first electric power for making the power hoe move by rolling over the soil cultivation tools and for making the cultivation tools cultivate the soil;
   a higher operating speed functionality, in which said motor is supplied with additional power compared to said first electric power, for a limited time period and as long as a corresponding higher speed button is held pressed by a user; and
   a downgraded operating mode, in which the electric power supplied to said motor, which actuates said soil cultivation tools, is limited to a level below said first electric power, and enables only the movement of said power hoe using said actuating soil cultivation tools,
   and wherein said electronic circuit stores at least one of the information items selected from the group consisting of:
   a number of switches to at least one of the normal, higher or downgraded operating modes; or
   an operating time in at least one of the normal, higher or downgraded operating modes.

* * * * *